April 24, 1962 C. W. FOLLEY 3,030,739
GRINDING APPARATUS AND METHOD
Filed May 27, 1960 2 Sheets-Sheet 1
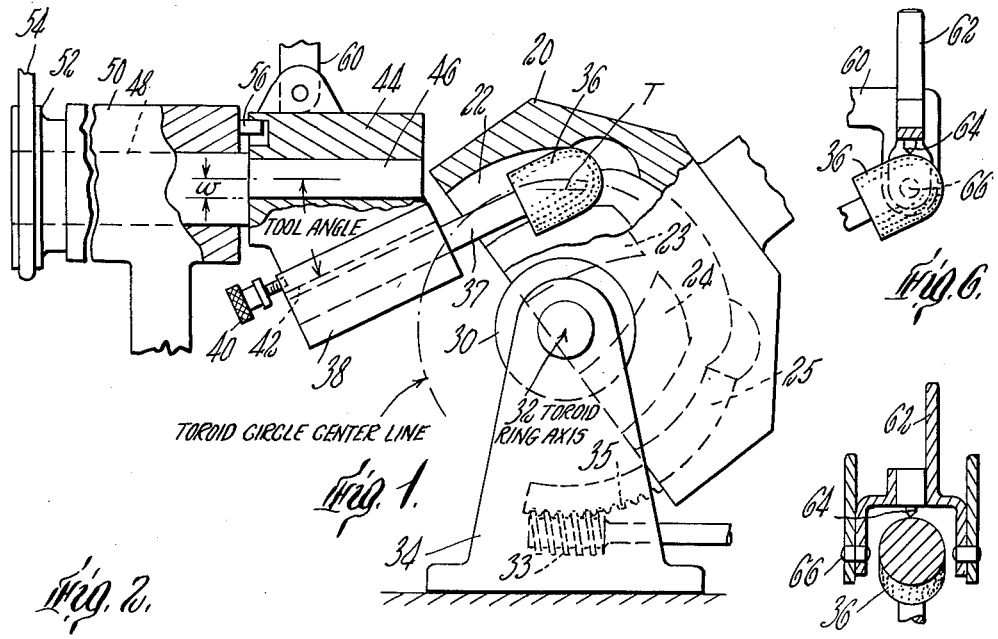
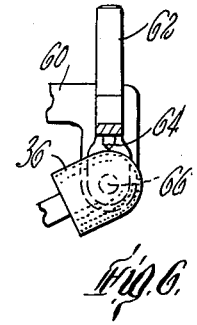
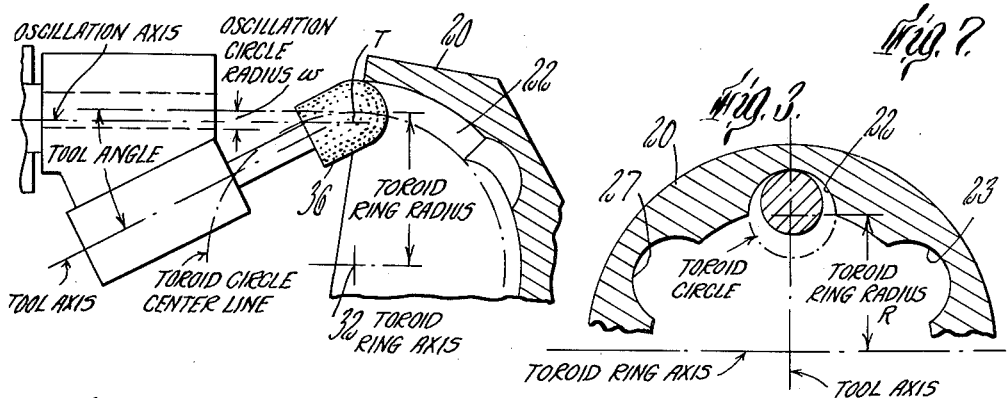
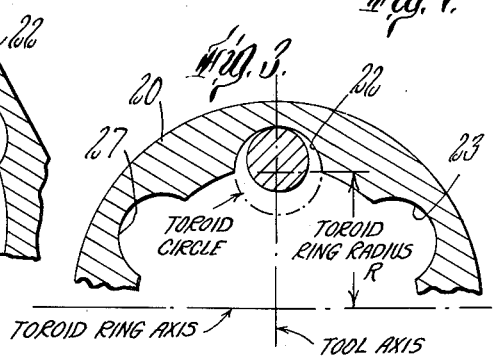
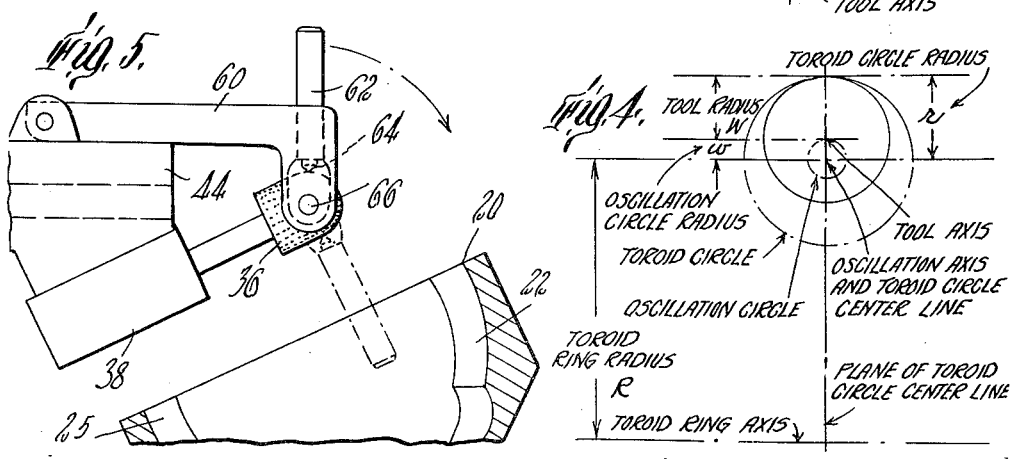
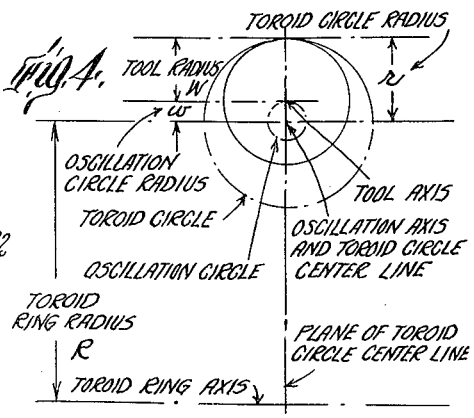

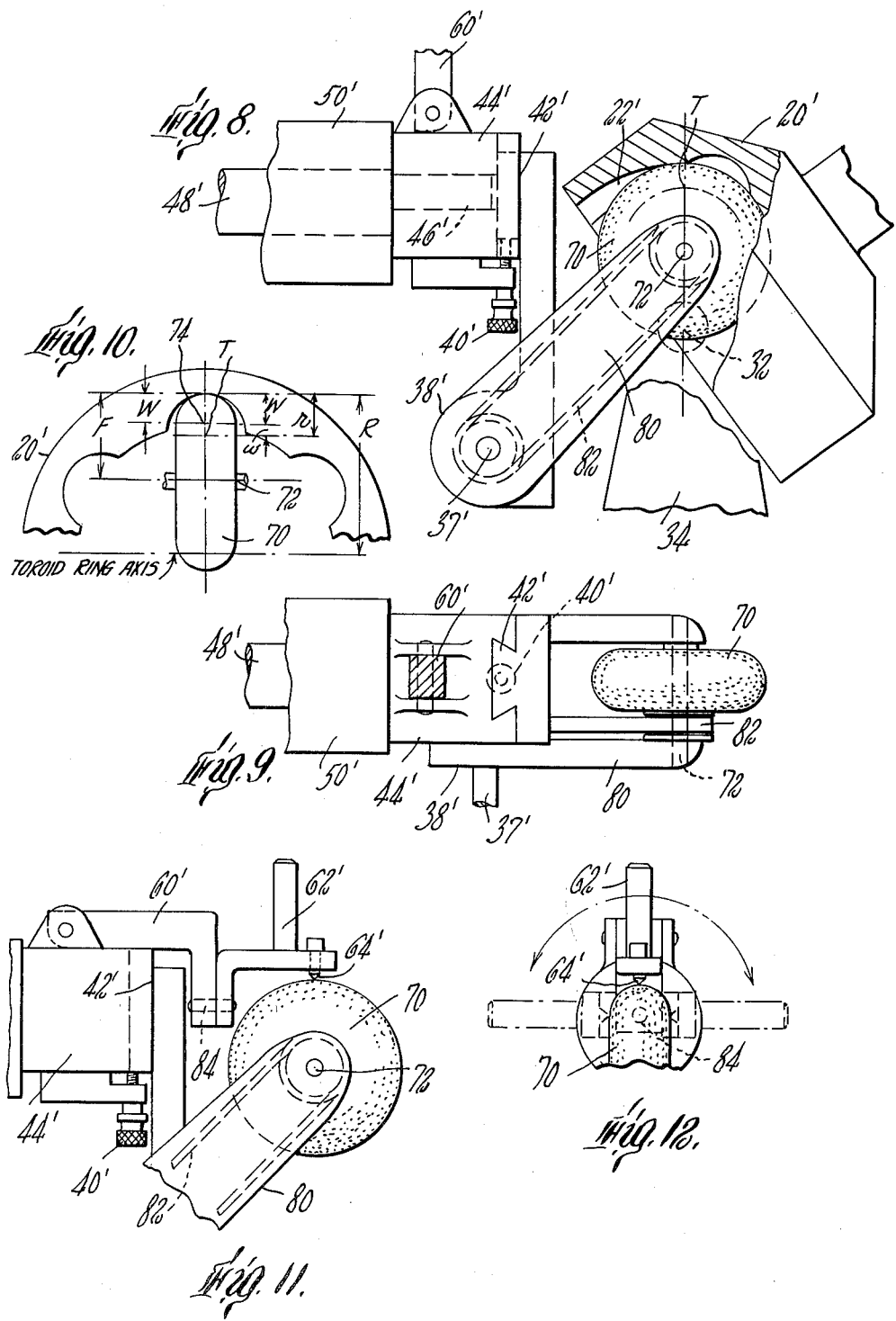

United States Patent Office 3,030,739
Patented Apr. 24, 1962

3,030,739
GRINDING APPARATUS AND METHOD
Cranston W. Folley, Kennebunk, Maine, assignor to Saco-Lowell Shops, Boston, Mass., a corporation of Maine
Filed May 27, 1960, Ser. No. 32,238
9 Claims. (Cl. 51—33)

This invention relates to apparatus and methods for grinding a curved groove having the configuration of a concave circular toroidal surface. It is especially useful for grinding ball races of the type used in Rzeppa constant velocity universal joints.

A Rzeppa joint, such as is well-known in the art, in general, includes a cuplike member having a number of ball races, usually six, extending away from the open end of the cup toward its closed end. These races or grooves have the form of a portion of a circular toroid, that is, they have a common center and their toroidal rings are of uniform circular cross section and are at a specific radius from such center. The race or groove itself is semi-circular and may extend for an angular extent of about 20–40° depending upon the movement needed for the joint. Although such universal joints have been widely used, their manufacture has been attended with considerable difficulty and expense because of the necessity of generating the toroid surface to the high degree of precision necessary for it to function as a ball race, usually by a grinding operation.

Accordingly, it is a major object of the present invention, to provide novel apparatus and methods for generating such toroidal grooves with the required degree of precision yet at a high rate of production which makes possible a substantial decrease in manufacturing expense. This has been accomplished, in general, by supporting a rotatable generating element having a circular generating surface for oscillation in a circular path about an axis tangent to the center line of the toroid circle to be generated in a workpiece, with the generating element itself rotating about an axis at an angle to the axis of oscillation. To generate the desired toroid circle, the sum of the radii of the circular path of oscillation and the generating element surface portion must be equal to the radius of the toroid circle. The toroid ring is generated by swinging the workpiece and the generating element relatively to one another about the axis of the toroid ring to be generated.

It is a particular feature of the invention that the apparatus and methods provided not only make it possible to generate the required grooves throughout a cross section as great or somewhat greater than 180° by utilizing only tangential contact of the generating element, as is especially important with such elements as grinding tools, but also makes possible adequate clearance for the generating element when generating the end of the groove most remote from the cuplike open end of the joint.

It is another object of the invention to provide means for dressing the generating element to a predetermined circular radius, so that it may readily be periodically corrected to maintain it at its required radius for the accurate manufacture of the toroidal grooved Rzeppa joint or the like.

Various other objects and features of the invention will be apparent from the following description of preferred embodiments thereof, together with the accompanying drawings, wherein, FIG. 1 is a diagrammatic side view, partially broken away, of apparatus according to the present invention;

FIG. 2 is a partial view similar to that of FIG. 1 with the elements thereof in a different operating position;

FIG. 3 is a partial cross section of the apparatus of FIG. 1;

FIG. 4 is an enlarged partial cross section of FIG. 1, showing in particular certain relationships thereof in simplified form;

FIG. 5 is a diagrammatic side view of the apparatus of FIG. 1 showing the tool dressing means thereof;

FIGS. 6 and 7 are a partial cross section of the tool dressing means of FIG. 5;

FIG. 8 is a diagrammatic side view, partially broken away, of a modification of the apparatus of FIGS. 1–7;

FIG. 9 is a plan view of the apparatus of FIG. 8;

FIG. 10 is a partial cross section of the apparatus of FIG. 8;

FIG. 11 is a diagrammatic side view of the apparatus of FIG. 8 showing the tool dressing means thereof; and FIG. 12 is a partial cross section of the tool dressing means of FIG. 11.

Referring to FIGS. 1–4, the cuplike Rzeppa joint 20 having six toroidal races or grooves 22, 23, . . . is mounted in a suitable workpiece holder 30 so that it may be swung by a worm 33 and gear 35 about a transverse shaft 32 in frame portion 34, the shaft axis, as is hereinafter more fully explained, being the toroid ring axis. A grinding wheel 36 or other tool is used to generate the groove 22, herein shown uppermost in FIGS. 1–4, said wheel being of generally cylindrical shape with a hemi-spherical end working surface portion, the radius of which must be substantially less than the radius of the groove, that is, the toroid circle radius. The wheel 36 is driven by a suitable shaft 37 and motor 38, for rotation about an axis inclined at an angle with respect to the toroid circle center line, and is movable by a screw element 40 along said axis for dressing by means of a slide 42 on the wheel supporting member 44. Said supporting member 44 is mounted on a shaft 46 eccentrically rotated by main shaft 48 which is mounted in frame portion 50 and driven by its pulley 52 and belt 54 by any suitable means (not shown). Supporting member 44 is prevented from rotating although it is free to move eccentrically in a circular path about the oscillation axis, that is, the axis of main shaft 48, by a pin 56 operating in a recess in member 44. As shown in FIGS. 5, 6 and 7, grinding wheel dressing means is provided in the form of an arm 60 pivotally mounted on supporting member 44 for movement into and out of operative position. At its outer end, arm 60 has mounted thereon a diamond holder 62 carrying a diamond 64 for pivotal movement on transverse shafts 66.

Turning now to FIG. 4, in order that the structure of the invention and its operation may more readily be understood, consider that the circular toroid surface portion to be generated is defined as having its toroid surface ring axis along the swinging axis of workpiece holder shaft 32 and its toroid circle displaced therefrom with its center line at a radius R therefrom, the radius of the toroid circle being defined as $r$. The oscillation axis, that is, the axis of main shaft 48 about which the center of the working surface of the grinding wheel 36 is moved in a circular path, is tangent to the toroid circle center line in its plane at point T, while the center of the oscillating movement of the tool axis, that is, the axis of grinding wheel 36, intersects said oscillation axis at point T. Thus, the axis of the grinding wheel intersects the circular path of the axis of oscillation at an angle thereto in the plane of the toroid circle at the point of tangency T of said oscillating axis and said center line. The angle of intersection, herein called the tool angle, is principally determined by the clearance required by the wheel 36 and its mountings when in its innermost position as shown in FIG. 1. The grinding wheel 36 being of radius W substantially less than the radius $r$ of the toroid circle (the race or groove radius), is related thereto because the sum of the radius $w$ of the circular path of travel of the grinding wheel and the radius of the grinding wheel hemispherical free end W are equal to the toroid circle radius r.

The dressing diamond 64 is also positioned relatively to the toroid surface, its axis of rotation about its shafts 66 being perpendicular to and passing through the grinding wheel center in the plane where its center of oscillation intersects the oscillation axis at tangent point T, and its radial distance from the grinding wheel axis being equal to the grinding wheel radius W. Since the diamond 64 moves with supporting element 44 carrying the grinding wheel 36, dressing thereof to provide the required wheel surface is accomplished simply by advancing it by screw 40 for a suitable distance, then, while the wheel is rotated, swinging the holder 62 throughout its travel, from the twelve o'clock position of FIG. 5 to the five o'clock position perpendicular to the axis of tool shaft 37 shown dotted in FIG. 5 to dress the wheel, and finally swinging arm 60 to its inoperative position as shown in FIG. 1.

With the grinding wheel dressed to its desired diameter, wherein $r=W+w$, the Rzeppa joint 20 to be ground is mounted in workpiece holder 30 so that the toroidal ring axis of its groove 22 coincides with the axis of swing. With the grinding wheel 36 being rotated as well as being oscillated in a circular path of radius $w$ by shaft 48, the Rzeppa joint is swung as by rotating worm 33 about its axis 32 from its position as shown in FIG. 1 at the rear or bottom end of the groove 22 to its position at the front or top end of the groove 22 as shown in FIG. 2. During such swinging movement, the wheel 36 is rotated at a high speed of several thousand r.p.m. and is oscillated at several hundred r.p.m. so that its surface and that of the groove 22 being generated are in tangential contact for most efficient grinding.

Upon completion of the grinding of groove 22, joint 20 is repositioned in holder 24 so that the coincidental axis relationship of the toroid ring surface portion to be ground and axis 32 are satisfied and the grinding step is repeated. Such must be carried out for each of the grooves 22, 23, . . . to be ground, herein shown as six in number, in order to complete the joint. Wheel dressing may be carried out as desired during the grinding of one or more joints 20 as by swinging the joint 20 out of the way and moving arm 60 to its operative position for dressing (FIG. 5) and then dressing as is set forth above.

A modification of the structure of FIGS. 1–7 is shown in FIGS. 8–12, which modification differs mainly in that the grinding wheel 70 thereof is of disk-like configuration having a free edge of semi-circular cross section, with the radius of said wheel being substantially less than the radius R of the toroid circle center line and the radius F of its free edge being substantially less than that of the toroid circle of groove 22. As before, the wheel 70 is located and mounted for oscillation about the axis of shaft 48 so that the center of its semi-circular edge portion moves in a circular path about the oscillation axis of shaft 48, the sum of the radii of said circular path $w$ and said semi-circular portion W being equal to that of the toroid circle $r$. However, with the structure of FIGS. 8–12, the wheel 70 rotates about a shaft 72 positioned parallel to the toroid ring axis on a radial between the toroid ring axis of workpiece holder shaft 32 and the point of tangency T of the oscillation axis of shaft 48 and toroid circle center line (consider FIG. 10 with FIG. 4). Said shaft 72 is mounted on an offset arm 80 of its motor 38', with said arm being arranged at an angle to the axis of shaft 48 for clearance of the joint 20' as before. Grinding wheel 70 is driven from motor shaft 37' as by a suitable belt 82.

For dressing, motor 38' is mounted on its supporting member 44' by means of a slide 42' for movement in a direction parallel to the toroid ring radial along which it moves in the plane of said ring. As before, an arm 60' is provided carrying at its outer end a holder 62' carrying a diamond 64', but with the present structure holder 62' is mounted for swinging movement on shaft 84 about an axis coincident with the center of the grinding wheel 70 semi-circular edge center 74 and at the desired radius W. Thus, if the wheel edge is advanced in a direction along slide 42' by its screw element 40', and holder 62' is swung between its three and nine o'clock positions as shown in FIG. 12, the wheel edge will be dressed as required.

With the wheel so dressed, operation of the apparatus of FIGS. 8–12 to grind a joint 20' is as described above with reference to FIGS. 1–7.

Thus, it will be seen that the apparatus and methods of the present invention make possible the grinding of concave circular toroid surface portions to the required standards of precision yet at high production rates. Various modifications of the invention within the spirit thereof and the scope of the appended claims will be apparent to those skilled in this art.

I claim:
1. A method of generating a concave circular toroidal surface on a workpiece comprising oscillating a generating element having a circular generating surface portion in a circular path in the plane of the toroid circle about an axis tangent to the center line of the toroid circle and in the plane of the toroid ring along said center line, the sum of the radii of said circular path and said generating element surface portion being equal to that of the toroid circle, while rotating said generating element about an axis at an angle to said axis of oscillation and swinging said workpiece and said element relatively to one another about the axis of the toroid ring.

2. A method as claimed in claim 1 wherein said generating element axis of rotation intersects the circular path of said oscillating axis in the plane of the toroid circle at the point of tangency of said oscillating axis and said center line.

3. A method as claimed in claim 1 wherein said generating element is rotated about an axis perpendicular to said toroid circle center line and spaced between it and said toroid ring axis.

4. Apparatus for generating a concave circular toroidal surface on a workpiece comprising a rotatable generating element having a circular generating surface portion in the plane of the toroid circle to be generated, means supporting said generating element for oscillation in a circular path about an axis tangent to the center line of the toroid circle and in the plane of the toroid ring along said center line, the sum of the radii of said circular path and said generating element surface portion being equal to that of the toroid circle, means supporting said generating element for rotation about an axis at an angle to said axis of oscillation, workpiece holding means, and means for swinging said workpiece holding means relatively to said generating element about the axis of the toroid ring to be generated.

5. Apparatus as claimed in claim 4 further including means movable between an operative and inoperative position defining said circular generating surface.

6. Apparatus for grinding a concave circular toroidal surface on a workpiece comprising a grinding element of cylindrical shape with a hemispherical free end rotatable about its central axis, grinding element support means supporting said rotatable grinding element for oscillation in a circular path about an axis tangent to the center line of the toroid circle and in the plane of the toroid ring along said center line and for rotation about an axis oscillating with said axis of oscillation and intersecting the circular path of said axis of oscillation at an angle thereto in the plane of the toroid circle at the point of tangency of said oscillating axis and said center line, the sum of the radii of said circular path and said grinding element hemispherical free end being equal to that of the toroid circle, workpiece holding means, and means for swinging said workpiece holding means relatively to said means supporting said grinding element about the axis of the toroid ring of the toroidal surface portion to be ground.

7. Apparatus as claimed in claim 6 further including means for advancing said grinding element in a direction along its axis of rotation and means mounted on said grinding element support means movable between an inoperative and an operative position defining said hemispherical free end, including dressing means for said grinding means movable in the plane of said toroid circle center line about an axis perpendicular to the toroid thereto the point of intersection of said grinding means axis with said circle of oscillation and on a radius equal to that of said hemispherical free end.

8. Apparatus for grinding a concave circular toroidal surface on a workpiece comprising a rotatable grinding element of disklike shape with a free edge of semi-circular cross section, grinding element support means supporting said rotatable grinding element for oscillation in a circular path about an axis tangent to the center line of the toroid circle and in the plane of the toroid ring along said center line and for rotation about an axis oscillating with said axis of oscillation and perpendicular to said toroid circle center line and spaced between it and said toroid ring axis, the sum of the radii of said circular path and said grinding element semi-circular cross section being equal to that of the toroid circle, workpiece holding means and means for swinging said workpiece holding means relatively to said means supporting said grinding element about the axis of the toroid ring of the toroidal surface portion to be ground.

9. Apparatus as claimed in claim 8 further including means for advancing said grinding element in a direction along a radius of said toroid ring and means mounted on said grinding element support means movable between an inoperative and an operative position defining said semi-circular cross section, including dressing means for said grinding means movable in the plane of said toroid circle about an axis parallel to a tangent thereto and on a radius equal to that of said semi-circular cross section.

References Cited in the file of this patent

UNITED STATES PATENTS

| | | |
|---|---|---|
| 2,076,508 | Van Norman | Apr. 6, 1937 |
| 2,188,675 | Cramer | Jan. 30, 1940 |
| 2,392,478 | Holman | Jan. 8, 1946 |
| 2,459,406 | Anderson | Jan. 18, 1949 |
| 2,463,698 | Kline | Mar. 8, 1949 |
| 2,814,915 | Messerschmidt | Dec. 3, 1957 |
| 2,862,338 | Hill | Dec. 2, 1958 |